(12) United States Patent
Ishihara et al.

(10) Patent No.: US 10,213,991 B2
(45) Date of Patent: Feb. 26, 2019

(54) MULTILAYERED CONTAINER

(71) Applicant: TOYO SEIKAN GROUP HOLDINGS, LTD., Tokyo (JP)

(72) Inventors: Takayuki Ishihara, Kanagawa (JP); Yuuki Tashiro, Kanagawa (JP); Kota Mori, Kanagawa (JP); Go Saito, Kanagawa (JP)

(73) Assignee: TOKYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 14/430,328

(22) PCT Filed: Sep. 27, 2013

(86) PCT No.: PCT/JP2013/076376
§ 371 (c)(1),
(2) Date: Mar. 23, 2015

(87) PCT Pub. No.: WO2014/051093
PCT Pub. Date: Apr. 3, 2014

(65) Prior Publication Data
US 2015/0251390 A1    Sep. 10, 2015

(30) Foreign Application Priority Data

Sep. 28, 2012  (JP) ................... 2012-217766

(51) Int. Cl.
  B28B 23/00    (2006.01)
  B29D 22/00    (2006.01)
  (Continued)

(52) U.S. Cl.
  CPC ............... B32B 27/08 (2013.01); B32B 1/02 (2013.01); B32B 7/12 (2013.01); B32B 27/18 (2013.01);
  (Continued)

(58) Field of Classification Search
  CPC ......... Y10T 428/1383; Y10T 428/3192; Y10T 428/1314; Y10T 428/1317;
  (Continued)

(56) References Cited

U.S. PATENT DOCUMENTS 5,064,724 A * 11/1991 Ofstein .................. 428/501
6,365,245 B2 * 4/2002 Blinka et al. ............ 428/35.7
(Continued)

FOREIGN PATENT DOCUMENTS

JP    2001-39475    2/2001
JP    2003-246026   9/2003
(Continued)

OTHER PUBLICATIONS

Robertson, Gordon L., Food Packaging: Principles and Practice, CRC Press. Boca Raton, FL. 2012 pp. 28 and 29.*
(Continued)

Primary Examiner — Lee E Sanderson
(74) Attorney, Agent, or Firm — Greenblum & Bernstein, P.L.C.

(57) ABSTRACT

A multilayered container includes at least a polyolefin inner layer; an adhesive layer; a gas-barrier layer; an oxygen-absorbing layer; a gas-barrier layer; an adhesive layer; a polyolefin outer layer, and having at least a body portion and a bottom portion, wherein the gas-barrier layers include an ethylene-vinyl alcohol copolymer, the oxygen-absorbing layer includes an oxygen-absorbing resin composition that contains the ethylene-vinyl alcohol copolymer and an oxidizing organic component, an adsorbing agent is contained on the side inside of said gas-barrier layer, the thickness of the multilayered container at the thinnest portion is not more than 430 μm, and the amount of oxygen absorbed after the heat-sterilization is not less than 23 cc per gram of the oxygen-absorbing resin composition. Despite of this
(Continued)

decreased thickness, the multilayered container maintains excellent oxygen-barrier property and property for retaining flavor of the content even when it is subjected to the retort sterilization.

2 Claims, 1 Drawing Sheet

(51) Int. Cl.

| | | |
|---|---|---|
| *B32B 27/08* | (2006.01) | |
| *B65D 65/40* | (2006.01) | |
| *C03C 17/32* | (2006.01) | |
| *B32B 27/32* | (2006.01) | |
| *B32B 1/02* | (2006.01) | |
| *B32B 7/12* | (2006.01) | |
| *B32B 27/18* | (2006.01) | |
| *B32B 27/30* | (2006.01) | |
| *B65D 1/28* | (2006.01) | |
| *B65D 25/14* | (2006.01) | |

(52) U.S. Cl.
CPC ............ *B32B 27/306* (2013.01); *B32B 27/32* (2013.01); *B65D 1/28* (2013.01); *B65D 25/14* (2013.01); *B32B 2250/24* (2013.01); *B32B 2307/412* (2013.01); *B32B 2307/7244* (2013.01); *B32B 2307/74* (2013.01); *B32B 2439/00* (2013.01); *B32B 2439/70* (2013.01)

(58) Field of Classification Search
CPC ......... Y10T 428/1321; Y10T 428/1352; B32B 2307/7242; B32B 2307/7244; B32B 3374/00; B32B 2264/102; B32B 27/32; B32B 27/34; B32B 27/302; B32B 27/306; B32B 25/04; B32B 25/08; B32B 25/16
USPC .......... 428/34.1, 34.5–34.7, 35.7–35.9, 36.6, 428/36.7, 36.91
See application file for complete search history.

(56) References Cited

U.S. PATENT DOCUMENTS

| | | |
|---|---|---|
| 7,255,904 B2 | 8/2007 | Tai et al. |
| 7,820,261 B2 | 10/2010 | Tai et al. |
| 2002/0176953 A1* | 11/2002 | Tsai et al. .................... 428/35.4 |
| 2005/0085577 A1* | 4/2005 | Ching ................... A23L 3/3418 |
| | | 524/394 |
| 2007/0042145 A1* | 2/2007 | Ohta et al. .................... 428/34.5 |
| 2009/0061061 A1* | 3/2009 | Beckwith et al. ............ 426/546 |
| 2010/0260953 A1 | 10/2010 | Tadaki et al. |

FOREIGN PATENT DOCUMENTS

| | | |
|---|---|---|
| JP | 2012-51353 | 3/2012 |
| KR | 10-2010-0072222 A | 6/2010 |
| WO | 2002/018489 | 3/2002 |
| WO | 2005/080076 | 9/2005 |

OTHER PUBLICATIONS

Search report from PCT/JP2013/076376, dated Jan. 7, 2014.
Office Action issued in Korean Counterpart Patent Appl. No. 10-2015-7009235, dated Feb. 1, 2017, with English translation.

* cited by examiner

MULTILAYERED CONTAINER

TECHNICAL FIELD

This invention relates to a multilayered container using an oxygen-absorbing barrier member as an intermediate layer. More specifically, the invention relates to a multilayered container having a reduced thickness and excellent barrier property and property for retaining flavor of the content even after the retort sterilization.

BACKGROUND ART

Metal cans, glass bottles and a variety of plastic containers have been used in the field of packing containers. Among them, plastic containers have been used for various applications from the standpoint of their light weight, shock resistance and cost. Here, however, though the metal cans and glass bobbles do not permit oxygen to pass through their walls, the plastic containers permit oxygen to pass through their walls to a degree that cannot be neglected causing a problem in regard to storing the contents.

To solve such a problem, there has been proposed a multilayered container having a wall of a multilayered structure, at least one of the layers thereof being a layer of a resin having excellent oxygen-barrier property, such as of an ethylene-vinyl alcohol copolymer. However, though the ethylene-vinyl alcohol copolymer exhibits excellent oxygen-barrier property, the oxygen-barrier property wanes if it is used under highly humid conditions. Therefore, it has been demanded to develop containers capable of exhibiting high oxygen-barrier property even when they are placed under highly humid conditions.

In order to remove oxygen remaining in the container or to remove oxygen infiltrating from the exterior, further, there have also been proposed multilayered containers provided with a layer of an oxygen-absorbing resin composition that contains ethylenically unsaturated hydrocarbons and a transition metal catalyst (patent documents 1 and 2). At the time of absorbing oxygen, however, the oxygen-absorbing resin composition generates bad-smelling components which are the oxidized and decomposed products of low molecular weights, and the taste and flavor of the content are spoiled by the bad-smelling components.

In order to solve such problems, the present applicant has proposed a plastic multilayered structure including an oxygen-barrier layer, an oxygen-absorbing layer and a thermoplastic resin layer containing zeolite of the high-silica type and having a high silica/alumina ratio (patent document 3).

PRIOR ART DOCUMENTS

Patent Documents

Patent document 1: JP-A-2001-39475
Patent document 2: Internal Publication WO2002/018489
Patent document 3: Internal Publication WO2005/080076

OUTLINE OF THE INVENTION

Problems that the Invention is to Solve

If the above plastic multilayered structure is used in a highly humid atmosphere, zeolite adsorbs the oxidized and decomposed products coming out of the structure, and the content is less affected by the oxidized and decomposed product. If used under high-temperature and highly humid conditions such as of retort sterilization, hot-water sterilization or boiling sterilization, however, the above plastic multilayered structure was not still satisfactory. That is, if used under high-temperature and highly humid conditions, the oxygen-absorbing resin composition absorbs oxygen and forms oxidized and decomposed products in increased amounts. Besides, the ethylene-vinyl alcohol copolymer exhibits decreased barrier property. Therefore, properties of the multilayered container greatly decrease after the retort sterilization.

It is, therefore, an object of the present invention to provide a multilayered container which has a decreased thickness yet being capable of maintaining excellent oxygen-barrier property and property for retaining flavor of the content even if it is subjected to high-temperature and highly humid conditions such as of retort sterilization.

Means for Solving the Problems

According to the present invention, there is provided a multilayered container having a multilayered structure that includes at least a polyolefin inner layer 1/an adhesive layer 2a/a gas-barrier layer 3a/an oxygen-absorbing layer 4/a gas-barrier layer 3b/an adhesive layer 2b/a polyolefin outer layer 5, and having at least a body portion and a bottom portion, wherein the gas-barrier layers 3a and 3b comprise an ethylene-vinyl alcohol copolymer, the oxygen-absorbing layer 4 comprises an oxygen-absorbing resin composition that contains the ethylene-vinyl alcohol copolymer and an oxidizing organic component, an adsorbing agent is contained on the side inside of the gas-barrier layer 3a, the thickness of the multilayered container at the thinnest portion is not more than 430 µm, and the amount of oxygen absorbed after the heat sterilization is not less than 23 cc per gram of the oxygen-absorbing resin composition.

In the multilayered container of the present invention, it is desired that:
1. At the thinnest portion of the multilayered container, the thickness of the oxygen-absorbing layer 4 is not less than 3 µm, the total thickness of the gas-barrier layers 3a and 3b is not less than 10 µm, and the total thickness of the oxygen-absorbing layer 4 and the gas-barrier layers 3a, 3b is not more than 55 µm;
2. The inner and outer layers comprise a polypropylene, and the adsorbing agent is zeolite;
3. The adsorbing agent-containing layer that contains the adsorbing agent is provided between the gas-barrier layer 3a and the inner layer 1;
4. The oxygen-absorbing resin composition contains a transition metal catalyst;
5. Reground-resin layers are formed between the inner/outer layers and the gas-barrier layers; and
6. The layer constitution comprises a polyolefin inner layer 1/an adsorbing agent-containing layer/an adhesive layer 2a/a gas-barrier layer 3a/an oxygen-absorbing layer 4/a gas-barrier layer 3b/an adhesive layer 2b/a reground-resin layer 6b/a polyolefin outer layer 5, and has at least a body portion and a bottom portion.

Effects of the Invention

Despite the thickness is as small as not more than 430 µm at the thinnest portion, the multilayered container of the present invention does not lose its excellent oxygen-barrier property and oxygen-absorbing property even when it is placed under high-temperature and highly humid conditions such as of retort sterilization, hot-water sterilization or boiling sterilization, effectively preventing a decrease in the taste and flavor of the content that may be caused by the formation of oxidized and decomposed products as a result of reaction upon absorbing oxygen. That is, in the multilayered container of the present invention, the adsorbing agent is contained in a layer on the inside of the gas-barrier layer 3a to drastically decrease the effect of the oxidized and decomposed products on the content and to improve properties for retaining the taste and flavor of the content.

Further, the two gas-barrier layers 3a and 3b are located on both sides, or on the inside and outside, of the oxygen-absorbing layer 4, the total thickness of the gas-barrier layers 3a and 3b is set to be not less than 10 μm, the thickness of the oxygen-absorbing layer 4 is set to be not less than 3 μm, and the total thickness of the gas-barrier layers 3a, 3b and the oxygen-absorbing layer 4 is set to be not more than 55 μm. Even if subjected to high temperature and high humidity conditions such as of retort sterilization, therefore, the oxygen-absorbing layer 4 maintains the amount of oxygen absorption of not less than 23 cc per gram of the oxygen-absorbing resin composition making it possible to maintain excellent oxygen-barrier property and flavor-retaining property. Further, it is allowed to decrease the thickness of the oxygen-absorbing layer to be smaller than that of the oxygen-absorbing layers of the conventional multilayered containers and to decrease the amount of the oxygen-absorbing resin composition used for the oxygen-absorbing layer providing advantage in economy, too.

The above-mentioned actions and effects of the multilayered container of the invention will become obvious from the results of Examples described later, too.

That is, it will be learned that the multilayered container of the invention has excellent gas-barrier property even after the retort sterilization, does not impair the flavor of the content, and can efficiently absorb oxygen, i.e., absorbs oxygen in an amount of not less than 23 cc per gram of the oxygen-absorbing resin composition (Examples 1 to 8).

On the other hand, it is obvious that a multilayered container (Comparative Example 1) having gas-barrier layers 3a, 3b having thicknesses smaller than those of Example 1, a multilayered container (Comparative Example 2) having the oxygen-absorbing layer 4 of a decreased thickness, a multilayered container (Comparative Example 7) without oxygen-absorbing layer 4, a multilayer container having gas-barrier layers 3a, 3b on only one side of the oxygen-absorbing layer 4 (Comparative Examples 4 and 5), and a multilayered container blended with no adsorbing agent (Comparative Example 6) are all inferior to the multilayered container of the present invention in regard to gas-barrier property and property for retaining flavor of the content after the retort sterilization. Further, a multilayered container could not be formed when it had a ratio of the total thickness of the gas-barrier layers 3a, 3b and the oxygen-absorbing layer 4 of 0.17 relative to the whole thickness of the multilayered container due to its conspicuous deviation in the thickness and in the density (Comparative Example 3).

MODES FOR CARRYING OUT THE INVENTION (Multilayered Structure)

Figure 1:
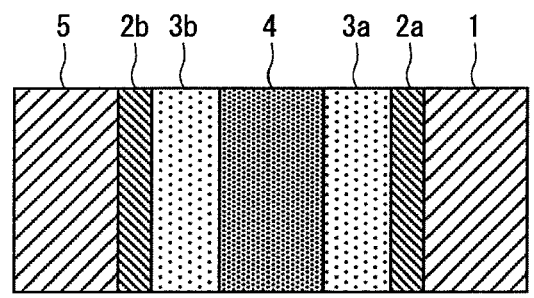
FIG. 1 is a view illustrating a multilayered structure in a multilayered container of the present invention.

The multilayered container of the present invention, as FIG. 1 shows its basic constitution, has a multilayered structure that includes at least a polyolefin inner layer 1/an inner adhesive layer 2a/an inner gas-barrier layer 3a/an oxygen-absorbing layer 4/an outer gas-barrier layer 3b/an outer adhesive layer 2b/a polyolefin outer layer 5.

Figure 2:
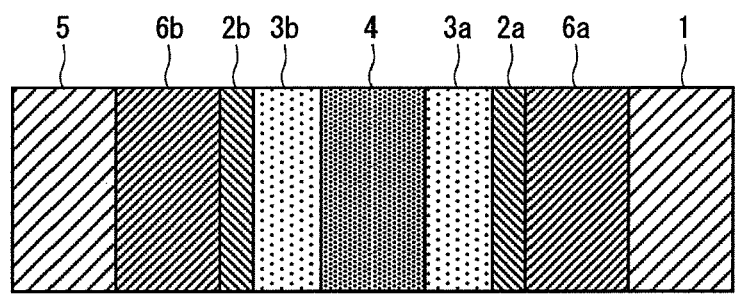
FIG. 2 is a view illustrating another multilayered structure in the multilayered container of the present invention.

It is, further, allowable to combine the above basic constitution with any other layers. Though not limited thereto only, it is desired, as shown in FIG. 2, to form reground-resin layers 6a, 6b of a reground resin containing an oxygen-absorbing resin composition between the inner/outer layers 1, 5 and the gas-barrier layer 4 or, concretely, between the inner layer 1 and the inner adhesive layer 2a and between the outer layer 5 and the outer adhesive layer 2b. It is specifically desired that the reground-resin layer is formed between the outer layer 5 and the outer adhesive layer 2b. This helps lengthen the distance over which the oxidized and decomposed product generated in the reground-resin layer containing the oxygen-absorbing resin composition reaches the inner layer and, therefore, helps improve property for retaining flavor of the content. Described below are examples of the multilayered structure though not limited thereto only.

Inner layer 1/adhesive layer 2a/gas-barrier layer 3a/oxygen-absorbing layer 4/gas-barrier layer 3b/adhesive layer 2b/outer layer 5;

Inner layer 1/adhesive layer 2a/gas-barrier layer 3a/oxygen-absorbing layer 4/gas-barrier layer 3b/adhesive layer 2b/reground-resin layer 6b/outer layer 5;

Inner layer 1/reground-resin layer 6a/adhesive layer 2a/gas-barrier layer 3a/oxygen-absorbing layer 4/gas-barrier layer 3b/adhesive layer 2b/reground-resin layer 6b/outer layer 5.

In the multilayered container having the above-mentioned basic constitution of the present invention, an important feature resides in that the thickness at the thinnest portion is not more than 430 μm, specifically, in a range of 360 to 50 μm, preferably, 300 to 100 μm and, more preferably, 300 to 150 μm. In the present invention as described above, the gas-barrier layers 3a and 3b are arranged on both sides of the oxygen-absorbing layer 4, and their thicknesses are controlled to decrease the thickness yet maintaining gas-barrier property and property for retaining flavor of the content after the heat sterilization such as retort sterilization.

As for a concrete example of controlling the thicknesses of the oxygen-absorbing layer and the gas-barrier layers of the multilayered container of the invention, it is desired that, in the thinnest portion of the multilayered container, the thickness of the oxygen-absorbing layer 4 is set to be 3 to 45 μm and, specifically, 5 to 34 μm, the total thickness of the gas-barrier layers 3a and 3b is set to be 10 to 52 μm and, specifically, 10 to 41 μm, the thickness of either the gas-barrier layer 3a or the gas-barrier layer 3b is set to be 5 to 47 μm and, specifically, 5 to 36 μm, and the total thickness of the gas-barrier layers 3a, 3b on both sides and of the oxygen-absorbing layer 4 is set to be in a range of 15 to 55 μm and, specifically, 15 to 44 μm. It is desired that the total thickness of the gas-barrier layers 3a, 3b on both sides and of the oxygen-absorbing layer 4 is in a range of 0.15 to 0.05%, specifically, 0.15 to 0.10% and, preferably, 0.13 to 0.10% relative to the whole thickness of the multilayered container at its thinnest portion.

If the thickness of the oxygen-absorbing layer 4 is smaller than the above range, oxygen remaining in the container or oxygen infiltrating therein from the exterior may not be trapped to a sufficient degree. If the thickness of the oxygen-absorbing layer 4 is larger than the above range, on the other hand, it becomes difficult to decrease the thickness of the wall of the container to lie within the above-mentioned range bringing about disadvantage in economy. Further, if the total thickness of the gas-barrier layers 3a and 3b is smaller than the above range, the gas-barrier property cannot be exhibited to a sufficient degree. If the total thickness of the gas-barrier layers 3a and 3b is larger than the above range, on the other hand, it becomes difficult, either, to decrease the thickness of the wall of the container to lie within the above-mentioned range bringing about disadvantage in economy.

Further, in the multilayered container of the present invention, the adsorbing agent is contained in the layer of inner layer side of the gas-barrier layer 3a, thereby, the content is significantly less affected by the oxidized and decomposed product.

It is, further, desired that the adsorbing agent is contained in any layer provided between the gas-barrier layer 3a and the inner layer 1. This suppresses the content from adsorbing bad-smelling components. As a result, property for retaining flavor of the content is improved. Described below are examples of the multilayered structure containing the adsorbing agent, though not limited thereto only.

Inner layer 1 containing adsorbing agent/adhesive layer 2a/gas-barrier layer 3a/oxygen-absorbing layer 4/gas-barrier layer 3b/adhesive layer 2b/outer layer 5;

Inner layer 1 containing adsorbing agent/adhesive layer 2a/gas-barrier layer 3a/oxygen-absorbing layer 4/gas-barrier layer 3b/adhesive layer 2b/reground-resin layer 6b/outer layer 5;

Inner layer 1 containing adsorbing agent/reground-resin layer 6a/adhesive layer 2a/gas-barrier layer 3a/oxygen-absorbing layer 4/gas-barrier layer 3b/adhesive layer 2b/reground-resin layer 6b/outer layer 5;

Inner layer 1/reground-resin layer 6a containing adsorbing agent/adhesive layer 2a/gas-barrier layer 3a/oxygen-absorbing layer 4/gas-barrier layer 3b/adhesive layer 2b/reground-resin layer 6b/outer layer 5;

Inner layer 1/polyolefin layer containing adsorbing agent/adhesive layer 2a/gas-barrier layer 3a/oxygen-absorbing layer 4/gas-barrier layer 3b/adhesive layer 2b/reground-resin layer 6b/outer layer 5;

(Gas-Barrier Layers 3a and 3b)

In the multilayered container of the present invention, the gas-barrier layers 3a and 3b comprise an ethylene-vinyl alcohol copolymer.

The ethylene-vinyl alcohol copolymer by itself may be a known one. Desirably, however, the ethylene-vinyl alcohol copolymer is a saponified product of an ethylene-vinyl copolymer having an ethylene content of 24 to 48 mol % and, specifically, 24 to 32 mol %, and is obtained by so saponifying the ethylene-vinyl acetate copolymer that the saponification degree thereof is not less than 96 mol % and, specifically, not less than 99 mol %.

The ethylene-vinyl alcohol copolymer should have a molecular weight large enough for forming a film and, desirably, has an intrinsic viscosity of not less than 0.01 dL/g and, specifically, not less than 0.05 dL/g as measured in a mixed solvent of phenol and water at a weight ratio of 85 to 15 at 30° C.

It is desired that the total thickness of the gas-barrier layers 3a and 3b at the thinnest portion of the multilayered container is in a range of 10 to 52 μm and, specifically, 10 to 41 μm maintaining a prerequisite that the above-mentioned relationship of thickness thereof to the thickness of the oxygen-absorbing layer 4 is being satisfied.

(Oxygen-Absorbing Layer 4)

In the multilayered container of the invention, the oxygen-absorbing layer 4 comprises an oxygen-absorbing resin composition that contains the ethylene-vinyl alcohol copolymer and an oxidizing organic component.

The oxygen-absorbing resin composition contains the ethylene-vinyl alcohol copolymer as the matrix and contains, as the oxygen-absorbing component, an oxidizing organic component that is dispersed in the matrix of the ethylene-vinyl alcohol copolymer. Therefore, the oxygen-absorbing resin composition has a function for blocking oxygen as well as a function for absorbing and trapping oxygen that permeates therethrough. Upon being blended with a transition metal salt, further, the oxygen-absorbing resin composition exhibits more improved absorbing capability.

The ethylene-vinyl alcohol copolymer is, desirably, the same one as the ethylene-vinyl alcohol copolymer used for the gas-barrier layers 3a and 3b.

As the oxidizing organic component, there can be exemplified an ethylenically unsaturated group-containing polymer. This polymer has a carbon-carbon double bond which can be easily oxidized with oxygen to thereby absorb and trap oxygen.

The ethylenically unsaturated group-containing polymer is derived with, for example, a polyene as a monomer. Suitable examples of the polyene used as the monomer include, though not limited thereto only, conjugated dienes such as butadiene and isoprene; chain nonconjugated dienes such as 1,4-hexadiene, 3-methyl-1,4-hexaiene, 4-methyl-1,4-hexadiene, 5-methyl-1,4-hexadiene, 4,5-dimethyl-1,4-hexadiene, and 7-methyl-1,6-octadiene; cyclic nonconjugated dienes such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene and dicyclopentadiene; and trienes and chloroprenes such as 2,3-diisopropylidene-5-norbornene, 2-ethylidene-3-isopropylidene-5-norbornene and 2-propenyl-2,2-norbornadiene. As the oxidizing organic component, there can be used homopolymers of the above polyenes or random copolymers or block copolymers of two or more of the above polyenes often in further combination with any other monomers.

As other monomers to be copolymerized with the above polyene, there can be exemplified α-olefins having 2 to 20 carbon atoms or, concretely, ethylene, propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, and 12-ethyl-1-tetradecene. In addition to them, there can be, further, used styrene, vinyltriene, acrylonitrile, methacrylonitrile, vinyl acetate, methyl methacrylate and ethyl acrylate.

Among the polymers derived from the above polyene, preferred examples of the oxidizing organic component are polybutadiene (BR), polyisoprene (IR), natural rubber, nitrile-butadiene rubber (NBR), styrene-butadiene rubber (SBR), chloroprene rubber and ethylene-propylene-diene rubber (EPDM) though not limited thereto only. The iodine values thereof are, desirably, not less than 100 and, specifically, about 120 to about 196.

In addition to the above ethylenically unsaturated group-containing polymers, there can be used, as oxidizing organic components, polymers which by themselves can be easily oxidized, such as polypropylene, ethylene-carbon oxide copolymer and the like.

It is desired that the above oxidizing polymers and copolymers thereof have a viscosity in a range of 1 to 200 Pa·s at 40° C. from the standpoint of formability.

The transition metal catalyst is for promoting the oxidation of the oxidizing organic component, and is used in the form of an inorganic salt, an organic salt or a complex of a transition metal of a low valence.

As the transition metal in the transition metal catalyst, there can be preferably used a metal of the Group VIII of periodic table, such as iron, cobalt or nickel. However, there can be, further, used a metal of the Group I such as copper or silver, a metal of the Group IV such as tin, titanium or zirconium, a metal of the Group V such as vanadium, a metal of the Group VI such as chromium, or a metal of the Group VII such as manganese. Among them, cobalt is specifically desired since it greatly promotes oxygen-absorbing property (oxidation of oxidizing organic component).

As the inorganic salt of the above transition metal, there can be exemplified a halide such as chloride, an oxysalt of sulfur such as sulfate, an oxyacid salt of nitrogen such as nitrate, a phosphorus oxysalt such as phosphate, and a silicate.

As the organic salt of the transition metal, there can be exemplified a carboxylate, a sulfonate and a phosphonate. Of them, however, the carboxylate is desired to attain the object of the invention. Concrete examples thereof include transition metal salts such as of acetic acid, propionic acid, isopropionic acid, butanoic acid, isobutanoic acid, pentanoic acid, hexanoic acid, heptanoic acid, isoheptanoic acid, octanoic acid, 2-ethylhexanoic acid, nonanoic acid, 3,5,5-trimetylhexanoic acid, decanoic acid, neodecanoic acid, undecanoic acid, lauric acid, myristic acid, palmitic acid, margaric acid, stearic acid, arachic acid, linderic acid, tsuzuic acid, petroselinic acid, oleic acid, linoleic acid, linolenic acid, arachidonic acid, formic acid, oxalic acid, sulfamic acid and naphthenic acid.

As the complex of the transition metal, there can be exemplified complexes with β-diketone or β-keto-acid ester. As the β-diketone or β-keto-acid ester, there can be exemplified acetylacetone, ethyl acetoacetate, 1,3-cyclohexadion, methylenebis-1,3-cyclohexadion, 2-benzyl-1,3-cyclohexadion, acetylteralone, palmitoyltetralone, stearoyltetralone, benzoyltetralone, 2-acetylcyclohexanone, 2-benzoylcyclohexanone, 2-acetyl-1,3-cyclohexadion, benzoyl-p-chlorobenzoylmethane, bis(4-methylbenzoyl) methane, bis (2-hydroxybenzoyl) methane, benzoylacetone, tribenzoylmethane, diacetylbenzoylmethane, stearoylbenzoylmethane, palmitoylbenzoylmethane, lauroylbenzoylmethane, dibenzoylmethane, bis(4-chlorobenzoyl) methane, benzoylacetylphenylmethane, stearoyl(4-methoxybenzoyl) methane, butanoylacetone, distearoylmethane, stearoylacetone, bis(cyclohexanoyl) methane and dipivaloylmethane.

The above-mentioned oxidizing organic component and the transition metal catalyst are dispersed in the ethylene-vinyl alcohol copolymer. The oxygen-absorbing component (specifically, oxidizing organic component) is dissipated upon absorbing oxygen accounting for a gradual decrease in the oxygen-absorbing capability. With the oxygen-absorbing component being dispersed in the ethylene-vinyl alcohol copolymer having a high oxygen-barrier property, however, it is allowed to suppress the dissipation of the oxygen-absorbing capability and to maintain the oxygen-absorbing capability for extended periods of time.

In the oxygen-absorbing layer 4, it is desired to use the oxidizing organic component in an amount of 1 to 15 parts by weight and, specifically, 2 to 10 parts by weight per 100 parts by weight of the ethylene-vinyl alcohol copolymer, and to use the transition metal catalyst in an amount of 10 to 1000 ppm and, specifically, 50 to 500 ppm calculated as the metal.

The thickness of the oxygen-absorbing layer 4 at the thinnest portion of the multilayered container is in a range of 3 to 45 μm and, specifically, 5 to 34 μm maintaining a prerequisite that a relation of its thickness relative to the thicknesses of the gas-barrier layers 3a, 3b has been satisfied.

(Inner layer 1)

In the multilayered container of the invention, the inner layer 1 comprises a polyolefin.

As the polyolefin, there can be exemplified polyethylenes (PE) such as low-density polyethylene (LDPE), medium-density polyethylene (MDPE), high-density polyethylene (HDPE), linear low-density polyethylene (LLDPE), linear very low-density polyethylene (LVLDPE), as well as isotactic polypropylene, syndiotactic polypropylene, homopolypropylene, polypropylene (PP), ethylene-propylene copolymer, polybutene-1, ethylene-butene-1 copolymer, propylene-butene-1 copolymer, ethylene-propylene-butene-1 copolymer, ethylene-vinyl acetate copolymer, ionically crosslinked olefin copolymer (ionomer), or blends thereof. Specifically, it is desired to use a crystalline propylene polymer from the standpoint of heat resistance during the retort sterilization. Namely, there can be used a homopolypropylene or a random copolymer or a block copolymer of chiefly propylene provided it is crystalline. From the standpoint of attaining shock resistance, further, there can be added a polyethylene or an elastomer component in amounts in a range in which they do not impair the heat resistance.

It is desired that the polypropylene has a melt flow rate (MFR) in a range of 0.1 to 5.0 g/10 min. (JISK 6758).

The thickness of the inner layer 1 at the thinnest portion of the multilayered container is in a range of, desirably, 10 to 150 μm and, specifically, 15 to 100 μm.

(Adsorbing Agent-Containing Layer)

In the present invention, the adsorbing agent is contained in the layer on the inside of the gas-barrier layer 3a. Between the gas-barrier layer 3a and the inner layer 1, further, there can be provided an olefin layer and a reground-resin layer in addition to the adhesive layer 2a, and the adsorbing agent is contained in these layers and, specifically, in the olefin such as polypropylene.

As the adsorbing agent, there can be used the one that has heretofore been known and, preferably, a powder of active clay obtained by treating, with an acid, a porous inorganic material comprising chiefly a silicate, such as a smectite clay mineral like zeolite or montmorillonite. Specifically, the high-silica zeolite which is the Na-type ZSM5 zeolite (silica/alumina ratio of not less than 100) is desired having an excellent function for trapping polymer odor specific to plastics and for trapping the oxidized and decomposed product described earlier.

It is desired that the adsorbing agent is contained, usually, in an amount of 0.5 to 10% by weight in the layer that is to contain the adsorbing agent.

(Outer Layer 5)

In the multilayered container of the present invention, the outer layer 5 can be formed by using the polyolefin that was described above concerning the inner layer 1 and using, specifically, the polypropylene like the inner layer 1.

The outer layer has a thickness in a range of, desirably, 10 to 150 μm and, specifically, 15 to 100 μm.

(Adhesive Layers 2a and 2b)

In the multilayered container of the invention, the ethylene-vinyl alcohol copolymer that constitutes the gas-barrier layer 4 has poor adhesiveness to the polyolefin layers 1 and 5 which are the inner and outer layers. Therefore, adhesive layers 2a and 2b are interposed among them.

As such an adhesive resin, there can be exemplified a thermoplastic resin that contains carbonyl (—CO—) groups based on the carboxylic acid, carboxylic anhydride, carboxylate, carboxylic acid amide or carboxylic acid ester in the main chain or in the side chains thereof at a concentration of 1 to 700 milliequivalents (meq)/100 g of resin and, specifically, 10 to 500 (meq)/100 g of resin.

Preferred examples of the adhesive resin include ethylene-acrylic acid copolymer, ionically crosslinked olefin copolymer, maleic anhydride-grafted polyethylene, maleic anhydride-modified polypropylene, maleic anhydride-grafted polypropylene, acrylic acid-grafted polyolefin, ethylene-vinyl acetate copolymer, and a blend of ethylene-vinyl alcohol copolymer and maleic anhydride-modified olefin resin. Specifically preferred examples are the maleic anhydride-modified polypropylene and the maleic anhydride-grafted polypropylene. The adhesive resins can be used in one kind or in a combination of two or more kinds, and can, further, be used being added into the olefin resin.

(Other Layers)

In the multilayered container of the present invention, the basic constitution may be, further, combined with any other layers. Here, as described earlier, it is desired to form a layer of a reground resin.

As the reground resin, there can be preferably used a sheet containing a resin comprising chiefly a polyolefin resin, and pulverized scraps generated in the step of forming containers such as cups and bottles. Though the reground resin only may be used, it is desired to use the virgin polyolefin in an amount of not more than 75% by mass from the standpoint of transparency suppressing uneven fluidity, appearance of the container such as color suppressing the formation of gum, non-melted material, gel or scorching, and from the standpoint of formability.

In the multilayered container of the present invention, the gas-barrier layer, oxygen-absorbing layer, and inner and outer layers may, as required, be blended with known blending agents such as filler, coloring agent, heat stabilizer, aging stabilizer, antioxidant, anti-aging agent, photo stabilizer, ultraviolet ray absorber, antistatic agent, lubricant such as metal soap or wax, reforming resin or rubber according to known recipe.

(Production of the Multilayered Containers)

The multilayered container of the present invention having the above-mentioned layer structure can be produced by a known method of producing multilayered containers.

For instance, a multilayered film or sheet is produced by the extrusion coating method, sandwich lamination or dry lamination of the films that has been formed in advance, and forming the film or the sheet into a multilayered container of the form of a cup, a tray or the like by the vacuum forming or the vacuum/compressed air forming such as plug assist forming, or by extruding and compression-forming a mass of resin.

Further, a multi-layered container of the shape of bottle or the like is formed through forming a preform having a predetermined layer structure by injection forming or extrusion forming, thereafter melt-forming the obtained preform by blow-forming or the like. Or, the multi-layered container is formed through extruding a molten resin so as to encapsulate an intermediate layer resin through merging in a multilayer die, and then the molten resin is cut at a portion where no intermediate layer resin is present and is put into a mold, thereafter compression-forming with the core mold.

To form a multilayered container having a thickness of not more than 430 µm at the thinnest portion, such as cup, tray or the like, a laminated sheet is formed having a thickness of 500 to 2000 µm though it may vary depending on L/D (mouth diameter (D) and height (L)) of the container to be formed. The multilayer sheet is then subjected to the vacuum forming or the vacuum/compressed air forming such as plug assist forming.

EXAMPLES

The invention will now be described in further detail with reference to Examples which, however, are in no way to limit the invention.

1. Measuring Methods.

(Measuring the Thickness of the Thinnest Portion of the Multilayered Container)

By using a Magna-Mike, the multilayered container was measured for its thickness at the thinnest portion.

Further, the cross section of the container near the thinnest portion thereof was scraped off in a thickness of 30 µm by using a microtome. By using an optical microscope, the gas-barrier layer 3a, gas-barrier layer 3b and oxygen-absorbing layer 4 were measured for their thicknesses.

2. Methods of Evaluation.

(Evaluating Barrier Property of the Multilayered Containers)

One milliliter of distilled water was put into the multilayered container, and the mouth portion was hermetically heat-sealed with a lid member of polypropylene (inner layer)/aluminum foil/polyester (outer layer) in a nitrogen atmosphere. The multilayered container was subjected to the shower retort sterilization treatment at 120° C. for 30 minutes. After left to stand for 3 days at normal temperature, the oxygen concentration in the container was measured by using a gas chromatography (GC-14A, manufactured by Shimazu Co.).

As an index of decrease in the oxygen-barrier property through the retort treatment, the containers having an oxygen concentration of not higher than 0.05% were rated to be ○ regarding that almost no oxygen has permeated through before and after the retort treatment, and the containers having an oxygen concentration of higher than 0.05% were rated to be X.

(Evaluating the Residual Oxygen Absorption of the Multilayer Containers).

The multilayered container right after the retort sterilization treatment was cut into fine pieces, and about 3 to 4 g of it was fed into an oxygen-impermeable container [Hiretoflex: HR78-84, manufactured by Toyo Seikan Co. (cup-shaped polypropylene/steel foil/polypropylene laminated-layer container)] having a capacity of 85 cc and into which 1 cc of distilled water was put. The container was heat-sealed with a lid member comprising polypropylene (inner layer)/aluminum foil/polyester (outer layer) in the atmosphere (oxygen concentration of 20%). The container was stored for 40 days under a condition of 50° C., and the oxygen concentration in the container was measured by using the gas chromatography (GC-14A, manufactured by Shimazu Co.). From the measured values, amounts fed and the thickness of the oxygen-absorbing layer of the multilayered container, there was calculated the amount of oxygen absorbed per gram of the oxygen-absorbing resin composition used for the oxygen-absorbing layer.

(Functional Evaluation)

The multilayered container was fully filled with distilled water, and the mouth portion thereof was heat-sealed with a cover member of polypropylene (inner layer)/aluminum foil/polyester (outer layer). Thereafter, the multilayered container was subjected to the shower retort sterilization treatment at 120° C. for 30 minutes and was, thereafter, functionally evaluated by panelists. The evaluation was based on tasteless ⊚, tastes a little ○, tastes Δ, or tastes considerably X.

(Evaluating the Formability of the Multilayered Containers)

The multilayered container formed in the shape of a cup was evaluated for its appearance with the naked eye. The container was rated to be ○ if there was no problem, Δ if it was uneven or whitened to a slight degree, or X if it was uneven or if its thickness was irregular to a considerable degree.

3. Method of Preparation.

(Preparation of the Adsorbing Master Batch)

By using a biaxial extruder, a polypropylene [(Noblen FH1016, manufactured by Sumitomo Kagaku Co.), MFR 0.5 g/10 min (JIS K 7210)] was melt-kneaded at a forming temperature of 230° C. By using a powder feeder, the high-silica zeolite (Silton MT-100C-100, manufactured by Mizusawa Kagaku Kogyo Co.) which was the Na-type ZSM5 zeolite was added in an amount of 10% by weight relative to the polypropylene to thereby prepare a master batch.

(Preparation of the Multilayered Containers)

By using a multilayered sheet-forming machine, a multilayered sheet of a desired layer constitution was prepared. Thereafter, a cup, i.e., a multilayered container was formed by using a plug assist vacuum/compressed air forming machine. The forming temperature was about 180° C.

Example 1

In preparing the multilayered sheet, the outer layer was formed by using a polypropylene resin, the adhesive layer was formed by using an acid-modified polypropylene, the oxygen-absorbing layer was formed by using an oxygen-absorbing resin composition (Evar AP461B, manufactured by Kuraray Co.) containing an ethylene-vinyl alcohol copolymer as a base material, and the gas-barrier layer was formed by using ethylene-vinyl alcohol copolymer.

The prepared sheet possessed a thickness of 0.9 mm, and a layer constitution and a layer ratio of, from the inside of the container, an adsorbing agent-containing layer (10% by weight)/a reground-resin layer $6a$ (31.5% by weight)/an adhesive layer $2a$ (2% by weight)/a gas-barrier layer $3a$ (5% by weight)/an oxygen-absorbing layer 4 (3% by weight)/a gas-barrier layer $3b$ (5% by weight)/an adhesive layer $2b$ (2% by weight)/a reground-resin layer $6b$ (31.5% by weight)/an outer layer 5 (10% by weight). The reground-resin layer was blended with the reground resin and the polypropylene resin in an amount of 50 parts by weight each and, further, with a dispersant (GF-31, manufactured by Kuraray Co.). The reground resin consisted of pellets of the multilayered sheet provided with the oxygen-absorbing layer and the scraps generated during the formation of the cups which were pulverized by using a crusher. The adsorbing agent-containing layer was formed by blending the polypropylene resin with the above-mentioned absorbing master batch in such an amount that the concentration of the absorbing agent in the layer was 2% by weight. Next, a cup was formed to prepare a multilayered container having a volume of 75 cc. The obtained multilayered container was measured and evaluated for its properties as described above. The multilayered container was evaluated to have high barrier property even after the retort treatment. Functionally evaluated results and formability were favorable, too.

Example 2

A multilayered container was prepared, measured and evaluated in the same manner as in Example 1 but changing the ratio of layers to be, from the inside of the container, an adsorbing agent-containing layer (10% by weight)/a reground-resin layer $6a$ (30.5% by weight)/an adhesive layer $2a$ (2% by weight)/a gas-barrier layer $3a$ (5% by weight)/an oxygen-absorbing layer 4 (5% by weight)/a gas-barrier layer $3b$ (5% by weight)/an adhesive layer $2b$ (2% by weight)/a reground-resin layer $6b$ (30.5% by weight)/an outer layer 5 (10% by weight). The multilayered container was evaluated to have high barrier property even after the retort treatment, and the formability was favorable, too. In the functional evaluation, however, a slight degree of taste was felt presumably due to the oxidized and decomposed product. The cause was presumably due to a small thickness of the gas-barrier layer $3a$ and due to a large amount of the oxygen-absorbing resin composition contained in the reground-resin layer.

Example 3

A multilayered container was prepared, measured and evaluated in the same manner as in Example 1 but changing the thickness of the sheet into 1.0 mm. The multilayered container was evaluated to have high barrier property even after the retort treatment. Functionally evaluated results and formability were favorable, too.

Example 4

A multilayered container was prepared, measured and evaluated in the same manner as in Example 1 but changing the thickness of the sheet into 1.2 mm and the ratio of layers to be, from the inside of the container, an adsorbing agent-containing layer (10% by weight)/a reground-resin layer $6a$ (32% by weight)/an adhesive layer $2a$ (2% by weight)/a gas-barrier layer $3a$ (4% by weight)/an oxygen-absorbing layer 4 (4% by weight)/a gas-barrier layer $3b$ (4% by weight)/an adhesive layer $2b$ (2% by weight)/a reground-resin layer $6b$ (32% by weight)/an outer layer 5 (10% by weight). The multilayered container was evaluated to have high barrier property even after the retort treatment. Functionally evaluated results and formability were favorable, too.

Example 5

A multilayered container was prepared, measured and evaluated in the same manner as in Example 1 but changing the thickness of the sheet into 1.2 mm and the ratio of layers to be, from the inside of the container, an adsorbing agent-containing layer (10% by weight)/a reground-resin layer $6a$ (29% by weight)/an adhesive layer $2a$ (2% by weight)/a gas-barrier layer $3a$ (6% by weight)/an oxygen-absorbing layer 4 (6% by weight)/a gas-barrier layer $3b$ (6% by weight)/an adhesive layer $2b$ (2% by weight)/a reground-resin layer $6b$ (29% by weight)/an outer layer 5 (10% by weight).

The multilayered container was evaluated to have high barrier property even after the retort treatment. Functionally evaluated results were favorable, too. As for the cup formability, the appearance was slightly irregular. The cause was presumably due to that the gas-barrier layers $3a$, $3b$ and the oxygen-absorbing layer 4 possessed large thicknesses, the multilayered sheet was drawn down greatly, and the ethylene-vinyl alcohol copolymer was stretched irregularly.

Example 6

A multilayered container was prepared, measured and evaluated in the same manner as in Example 1 but changing the thickness of the sheet into 1.2 mm and the ratio of layers to be, from the inside of the container, an adsorbing agent-containing layer (10% by weight)/a reground-resin layer 6a (33.5% by weight)/an adhesive layer 2a (2% by weight)/a gas-barrier layer 3a (3% by weight)/an oxygen-absorbing layer 4 (3% by weight)/a gas-barrier layer 3b (3% by weight)/an adhesive layer 2b (2% by weight)/a reground-resin layer 6b (33.5% by weight)/an outer layer 5 (10% by weight). The multilayered container was evaluated to have high barrier property even after the retort treatment. Functionally evaluated results and formability were favorable, too.

Example 7

A multilayered container was prepared, measured and evaluated in the same manner as in Example 3 but blending the adsorbing agent-containing layer with the adsorbing agent at a concentration of 8% by weight. The multilayered container was evaluated to have high barrier property even after the retort treatment. Functionally evaluated results and formability were favorable, too. Specifically, there could be functionally evaluated a distinct improvement in the effect stemming from an increase in the amount of the adsorbing agent.

Example 8

A multilayered container was prepared, measured and evaluated in the same manner as in Example 3 but changing the layer constitution and the ratio of layers to be, from the inside of the container, an inner layer 1 (10% by weight)/an adsorbing agent-containing layer (31.5% by weight)/an adhesive layer 2a (2% by weight)/a gas-barrier layer 3a (5% by weight)/an oxygen-absorbing layer 4 (3% by weight)/a gas-barrier layer 3b (5% by weight)/an adhesive layer 2b (2% by weight)/a reground-resin layer 6b (31.5% by weight)/an outer layer 5 (10% by weight). The inner layer 1 was formed by using the polypropylene, and the adsorbing agent-containing layer was blended with the polypropylene and the above-mentioned adsorbing agent master batch in such amounts that the adsorbing agent concentration in the layer was 2.7% by weight. The multilayered container was evaluated to have high barrier property even after the retort treatment. Functionally evaluated results and formability were favorable, too. Specifically, improved flavor-retaining property could be functionally evaluated as a result of not forming the reground-resin layer 6a.

Comparative Example 1

A multilayered container was prepared, measured and evaluated in the same manner as in Example 1 but changing the layer constitution and the ratio of layers to be, from the inside of the container, an adsorbing agent-containing layer (10% by weight)/a reground-resin layer 6a (33.5% by weight)/an adhesive layer 2a (2% by weight)/a gas-barrier layer 3a (3% by weight)/an oxygen-absorbing layer 4 (3% by weight)/a gas-barrier layer 3b (3% by weight)/an adhesive layer 2b (2% by weight)/a reground-resin layer 6b (33.5% by weight)/an outer layer 5 (10% by weight). The barrier property was poor and the functional evaluation was poor, either. The cause was presumably due to that the gas-barrier layers 3a, 3b and the oxygen-absorbing layer 4 all possessed so small thicknesses that they could not prevent the permeation of oxygen or odor stemming from the oxidized and decomposed product.

Comparative Example 2

A multilayered container was prepared, measured and evaluated in the same manner as in Example 1 but changing the thickness of the sheet into 1.2 mm and the ratio of layers to be, from the inside of the container, an adsorbing agent-containing layer (10% by weight)/a reground-resin layer 6a (32.5% by weight)/an adhesive layer 2a (2% by weight)/a gas-barrier layer 3a (5% by weight)/an oxygen-absorbing layer 4 (1% by weight)/a gas-barrier layer 3b (5% by weight)/an adhesive layer 2b (2% by weight)/a reground-resin layer 6b (32.5% by weight)/an outer layer 5 (10% by weight). The functional evaluation was free of problem but the barrier property was poor. The cause was presumably due to too small thickness of the oxygen-absorbing layer 4. Despite the gas-barrier layers 3a and 3b possessed sufficiently large thicknesses, permeating oxygen could not be absorbed indicating that a balance plays an important role among the thicknesses of the oxygen-absorbing layer and the gas-barrier layers.

Comparative Example 3

A multilayered container was prepared in the same manner as in Example 1 but changing the thickness of the sheet into 1.2 mm and the ratio of layers to be, from the inside of the container, an adsorbing agent-containing layer (10% by weight)/a reground-resin layer 6a (27.5% by weight)/an adhesive layer 2a (2% by weight)/a gas-barrier layer 3a (7% by weight)/an oxygen-absorbing layer 4 (7% by weight)/a gas-barrier layer 3b (7% by weight)/an adhesive layer 2b (2% by weight)/a reground-resin layer 6b (27.5% by weight)/an outer layer 5 (10% by weight). The cup could not be formed due to greatly varying and irregular thickness. This was presumably due to the ethylene-vinyl alcohol copolymer that was added in large amounts to the gas-barrier layers 3a, 3b and to the oxygen-absorbing layer 4. The thicknesses of the layers were calculated from the thickness of the multilayered sheet that was prepared.

Comparative Example 4

A multilayered container was prepared, measured and evaluated in the same manner as in Example 1 but changing the thickness of the sheet into 1.2 mm and the ratio of layers to be, from the inside of the container, an adsorbing agent-containing layer (10% by weight)/a reground-resin layer 6a (34.5% by weight)/an adhesive layer 2a (2% by weight)/an oxygen-absorbing layer 4 (2% by weight)/a gas-barrier layer 3b (5% by weight)/an adhesive layer 2b (2% by weight)/a reground-resin layer 6b (34.5% by weight)/an outer layer 5 (10% by weight). The barrier property and the functional evaluation were both poor due to the absence of the gas-barrier layer 3a.

Comparative Example 5

A multilayered container was prepared, measured and evaluated in the same manner as in Example 1 but changing the thickness of the sheet into 1.2 mm and the ratio of layers to be, from the inside of the container, an adsorbing agent-containing layer (10% by weight)/a reground-resin layer 6a (34.5% by weight)/an adhesive layer 2a (2% by weight)/a gas-barrier layer 3a (5% by weight)/an oxygen-absorbing layer 4 (2% by weight)/an adhesive layer 2b (2% by weight)/a reground-resin layer 6b (34.5% by weight)/an outer layer 5 (10% by weight). The barrier property was poor due to the absence of the gas-barrier layer 3b.

Comparative Example 6

A multilayered container was prepared, measured and evaluated in the same manner as in Example 3 but changing the adsorbing agent-containing layer into a polypropylene resin layer. The functional evaluation was poor since no adsorbing agent was contained.

Comparative Example 7

In preparing a multilayered sheet, a polypropylene resin was used for forming the inner and outer layers, an adhesive resin was used for forming the adhesive layer and an ethylene-vinyl alcohol copolymer resin was used for forming the gas-barrier layers.

The prepared sheet possessed a thickness of 1.2 mm, and its layer constitution and layer ratio were, from the inside of the container, an inner layer (10% by weight)/a reground-resin layer (33% by weight)/an adhesive layer (2% by weight)/a gas-barrier layer (10% by weight)/an adhesive layer (2% by weight)/a reground-resin layer (33% by weight)/an outer layer (10% by weight). The reground-resin layer was blended with the reground resin and the polypropylene resin each in an amount of 50 parts by weight and, further, with a dispersing agent (GF-31, manufactured by Kuraray Co.) in an amount of 3 parts by weight. The reground resin was in the form of pellets obtained by pulverizing, by using a crusher, the scraps generated in forming the multilayered sheet and the cups. Next, a cup was formed to prepare a multilayered container of a volume of 75 cc. The obtained multilayered container was measured and evaluated as described above. As a result, oxygen has permeated in increased amounts during the retort treatment since there was no oxygen-absorbing layer.

Reference Example

A multilayered plastic container for retort that has been plated in the market was examined. There were used the thermal analysis (DSC), infrared ray absorption spectra (FT-IR) and an optical microscope to make sure the material, layer constitution and if the retort sterilization was conducted. It was determined that the multilayered container possessed inner and outer layers of a polypropylene and the gas-barrier layer of an ethylene-vinyl alcohol copolymer. From the spectra of thermal analysis, relaxation was observed in the enthalpy due to thermal hysteresis at a temperature higher than 100° C. and from which it was considered that the retort sterilization had been conducted. The multilayered container possessed a thickness of 434 μm at its thinnest portion, and the ethylene-vinyl alcohol copolymer layer possessed a thickness of 34.1 μm. Further, the barrier property was evaluated under the same conditions as in Example 1, and there was confirmed a large degree of oxygen permeation.

Table 1 shows the thicknesses of the multilayered sheets prepared under the above-mentioned conditions and the layer constitutions of the multilayered containers, and Table 2 shows the measured and evaluated results thereof.

Upon employing the layer constitutions and the layer ratios of the present invention as will be obvious from Tables 1 and 2, there were obtained excellent oxygen-barrier property and flavor-retaining property even after the sterilization by heating despite the containers had decreased thicknesses.

TABLE 1

| | * | Layer constitution |
|---|---|---|
| Ex. 1 | 0.9 mm | inner) adsorbing agent/reground 6a/adhesive 2a/gas barrier 3a/oxygen absorbing 4/gas barrier 3b/adhesive 2b/reground 6b/outer 5 (outer |
| Ex. 2 | 0.9 mm | inner) adsorbing agent/reground 6a/adhesive 2a/gas barrier 3a/oxygen absorbing 4/gas barrier 3b/adhesive 2b/reground 6b/outer 5 (outer |
| Ex. 3 | 1.0 mm | inner adsorbing agent/reground 6a/adhesive 2a/gas barrier 3a/oxygen absorbing 4/gas barrier 3b/adhesive 2b/reground 6b/outer 5 (outer |
| Ex. 4 | 1.2 mm | inner) adsorbing agent/reground 6a/adhesive 2a/gas barrier 3a/oxygen absorbing 4/gas barrier 3b/adhesive 2b/reground 6b/outer 5 (outer |
| Ex. 5 | 1.2 mm | inner) adsorbing agent/reground 6a/adhesive 2a/gas barrier 3a/oxygen absorbing 4/gas barrier 3b/adhesive 2b/reground 6b/outer 5 (outer |
| Ex. 6 | 1.2 mm | inner) adsorbing agent/reground 6a/adhesive 2a/gas barrier 3a/oxygen absorbing 4/gas barrier 3b/adhesive 2b/reground 6b/outer 5 (outer |
| Ex. 7 | 1.0 mm | inner) adsorbing agent/reground 6a/adhesive 2a/gas barrier 3a/oxygen absorbing 4/gas barrier 3b/adhesive 2b/reground 6b/outer 5 (outer |
| Ex. 8 | 1.0 mm | inner) inner layer 1/adsorbing agent/adhesive 2a/gas barrier 3a/oxygen absorbing 4/gas barrier 3b/adhesive 2b/reground 6b/outer 5 (outer |
| Comp. Ex. 1 | 0.9 mm | inner) adsorbing agent/reground 6a/adhesive 2a/gas barrier 3a/oxygen absorbing 4/gas barrier 3b/adhesive 2b/reground 6b/outer 5 (outer |
| Comp. Ex. 2 | 1.2 mm | inner) adsorbing agent/reground 6a/adhesive 2a/gas barrier 3a/oxygen absorbing 4/gas barrier 3b/adhesive 2b/reground 6b/outer 5 (outer |
| Comp. Ex. 3 | 1.2 mm | inner) adsorbing agent/reground 6a/adhesive 2a/gas barrier 3a/oxygen absorbing 4/gas barrier 3b/adhesive 2b/reground 6b/outer 5 (outer |
| Comp. Ex. 4 | 1.2 mm | inner) adsorbing agent/reground 6a/adhesive 2a/oxygen absorbing 4/gas barrier 3b/adhesive 2b/reground 6b/outer 5 (outer |
| Comp. Ex. 5 | 1.2 mm | inner) adsorbing agent/reground 6a/adhesive 2a/gas barrier 3a/oxygen absorbing 4/adhesive 2b/reground 6b/outer 5 (outer |
| Comp. Ex. 6 | 1.0 mm | inner) inner layer 1/reground 6a/adhesive 2a/gas barrier 3a/oxygen absorbing 4/gas barrier 3b/adhesive 2b/reground 6b/outer 5 (outer |
| Comp. Ex. 7 | 1.2 mm | inner) inner layer/reground/adhesive/gas barrier/adhesive/reground/outer (outer |

*: Thickness of multilayer sheet

TABLE 2

| | Multilayered container μm | Gas barrier layer 3a μm | Gas barrier layer 3b μm | Oxygen absorbing layer 4 μm | 3a + 3b μm | 3a + 3b + 4 μm | 3a + 3b + 4/ thickness of thinnest portion |
|---|---|---|---|---|---|---|---|
| | | | | Measuring the thickness of the thinnest portion | | | |
| Ex. 1 | 198 | 7.8 | 7.8 | 4.9 | 15.6 | 20.5 | 0.10 |
| Ex. 2 | 198 | 7.9 | 7.9 | 8.2 | 15.8 | 24.0 | 0.12 |
| Ex. 3 | 214 | 8.5 | 8.5 | 5.3 | 17.0 | 22.3 | 0.10 |
| Ex. 4 | 323 | 10.2 | 10.2 | 10.6 | 20.4 | 31.0 | 0.10 |
| Ex. 5 | 304 | 14.6 | 14.6 | 15.2 | 29.2 | 44.4 | 0.15 |
| Ex. 6 | 356 | 8.4 | 8.4 | 8.7 | 16.8 | 25.5 | 0.07 |
| Ex. 7 | 220 | 8.7 | 8.7 | 5.4 | 17.4 | 22.8 | 0.10 |
| Ex. 8 | 220 | 8.7 | 8.7 | 5.4 | 17.4 | 22.8 | 0.10 |
| Comp. Ex. 1 | 200 | 4.7 | 4.7 | 4.9 | 9.4 | 14.3 | 0.07 |
| Comp. Ex. 2 | 330 | 13.0 | 13.0 | 2.7 | 26.0 | 28.7 | 0.09 |
| Comp. Ex. 3 | (330) | (18.6) | (18.6) | (19.4) | (37.2) | (56.6) | 0.17 |
| Comp. Ex. 4 | 333 | 13.0 | 0.0 | 5.4 | 13.0 | 18.4 | 0.06 |
| Comp. Ex. 5 | 333 | 0.0 | 13.0 | 5.4 | 13.0 | 18.4 | 0.06 |
| Comp. Ex. 6 | 214 | 8.5 | 8.5 | μm | 17.0 | #VALUE! | #VALUE! |
| Comp. Ex. 7 | 330 | | | EVOH 25.9 μm | | — | — |
| Ref. Ex. | 434 | | | EVOH 34.1 μm | | — | — |

| | Barrier property of multilayered container % | Residual oxygen absorption of multilayered container cc/g | Functional evaluation | Formability evaluation of multilayered container |
|---|---|---|---|---|
| Ex. 1 | ○ (0.02 or less) | 26.0 | ○ | ○ |
| Ex. 2 | ○ (0.02 or less) | 24.4 | Δ | ○ |
| Ex. 3 | ○ (0.02 or less) | 27.9 | ○ | ○ |
| Ex. 4 | ○ (0.02 or less) | 28.5 | ○ | ○ |
| Ex. 5 | ○ (0.02 or less) | 30.6 | ○ | Δ |
| Ex. 6 | ○ (0.02 or less) | — | ○ | ○ |
| Ex. 7 | ○ (0.02 or less) | 27.9 | ○-◉ | ○ |
| Ex. 8 | ○ (0.02 or less) | 27.9 | ○-◉ | ○ |
| Comp. Ex. 1 | X (0.070) | 22.3 | Δ | ○ |
| Comp. Ex. 2 | X | — | ○ | ○ |
| Comp. Ex. 3 | — | — | — | X |
| Comp. Ex. 4 | X | — | X | ○ |
| Comp. Ex. 5 | X | — | ○ | ○ |
| Comp. Ex. 6 | ○ (0.02 or less) | 27.9 | X | ○ |
| Comp. Ex. 7 | X (0.300) | 0.0 | ○-◉ | ○ |
| Ref. Ex. | X (0.200) | 0.0 | — | — |

INDUSTRIAL APPLICABILITY

Even when put under high-temperature and high-humidity conditions such as of retort-sterilization, the multilayered container of the present invention does not permit oxygen-barrier property to decrease, maintains excellent oxygen-barrier property for extended periods of time, and effectively prevents a decrease in the property for retaining flavor of the content caused by the oxidized and decomposed product as a result of oxygen-absorbing reaction. Therefore, the multilayered container of the present invention can be effectively used for containing a variety of kinds of contents such as beverages and foods and, specifically, for containing the contents that are to be subjected to the heat-sterilization such as retort sterilization.

Moreover, the thickness is not more than 430 μm at the thinnest portion featuring light weight and economical advantage, enabling the container to be effectively used for containing general products that are mass-produced.

The contents that can be contained may be, though not limited thereto only, beverages such as beer, wine, fruit juices, carbonated soft drinks, etc., as well as fruits, nuts, vegetables, meat products, infant's foods, coffee, jams, mayonnaise, ketchup, edible oils, dressings, sauces, food boiled down in soy, milk products, processed fish, baby's foods, pet foods, etc. and, further, medicines, cosmetics, gasoline and the like that are subject to be degraded in the presence of oxygen.

Further, the container of the present invention features excellent transparency and can be favorably used as a packing container that requires transparency.

| Description of Reference Numerals: | |
|---|---|
| 1 inner layer | 2 adhesive layer |
| 3 gas-barrier layer | 4 oxygen-absorbing layer |
| 5 outer layer | 6 reground-resin layer |

The invention claimed is:

1. A multilayered container having a multilayered structure that includes, in the following order, at least a polypropylene inner layer/
an adsorbing agent-containing layer comprising a polypropylene that contains zeolite as an adsorbing agent/
an adhesive layer/
a first gas-barrier layer/
an oxygen-absorbing layer/
a second gas-barrier layer/
an adhesive layer/
a reground-resin layer/
a polypropylene outer layer, and having at least a body portion and a bottom portion, wherein said gas-barrier layers each consist of an ethylene-vinyl alcohol copolymer, said oxygen-absorbing layer comprises an oxygen-absorbing resin composition that contains an ethylene-vinyl alcohol copolymer and an oxidizing organic component dispersed in the ethylene-vinyl alcohol copolymer, said adsorbing agent-containing layer contains the zeolite in an amount of 2 to 8% by weight and adsorbs decomposed products that are formed by oxygen-absorbing reaction and that have passed through the first gas-barrier layer, said reground-resin layer comprises a reground resin and said oxygen-absorbing resin composition, the thickness of the multilayered container at the thinnest portion is in a range of 198 to 356 μm, the total thickness of the oxygen absorbing layer and the gas barrier layers is in a range of 20.5 to 44.4 μm at the thinnest portion of the multilayered container, the thickness of the oxygen absorbing layer is in a range of 4.9 to 15.2 μm, the total thickness of the gas-barrier layers is in a range of 15.6 to 29.2 μm, and the amount of oxygen absorbed after the heat-sterilization is not less than 23 cc per gram of the oxygen-absorbing resin composition.

2. The multilayered container according to claim 1, wherein said oxygen-absorbing resin composition contains a transition metal catalyst.

* * * * *

UNITED STATES PATENT AND TRADEMARK OFFICE
CERTIFICATE OF CORRECTION

PATENT NO. : 10,213,991 B2
APPLICATION NO. : 14/430328
DATED : February 26, 2019
INVENTOR(S) : T. Ishihara et al.

Page 1 of 1

It is certified that error appears in the above-identified patent and that said Letters Patent is hereby corrected as shown below:

On the Title Page

Item (73) Assignee (Line 1), please change "TOKYO SEIKAN" to --TOYO SEIKAN--.

Signed and Sealed this
Twenty-fourth Day of September, 2019

Andrei Iancu
*Director of the United States Patent and Trademark Office*